E. BERLINER.
PARACHUTE FOR HELICOPTERS.
APPLICATION FILED OCT. 6, 1911.
1,110,180.
Patented Sept. 8, 1914.
2 SHEETS—SHEET 1.
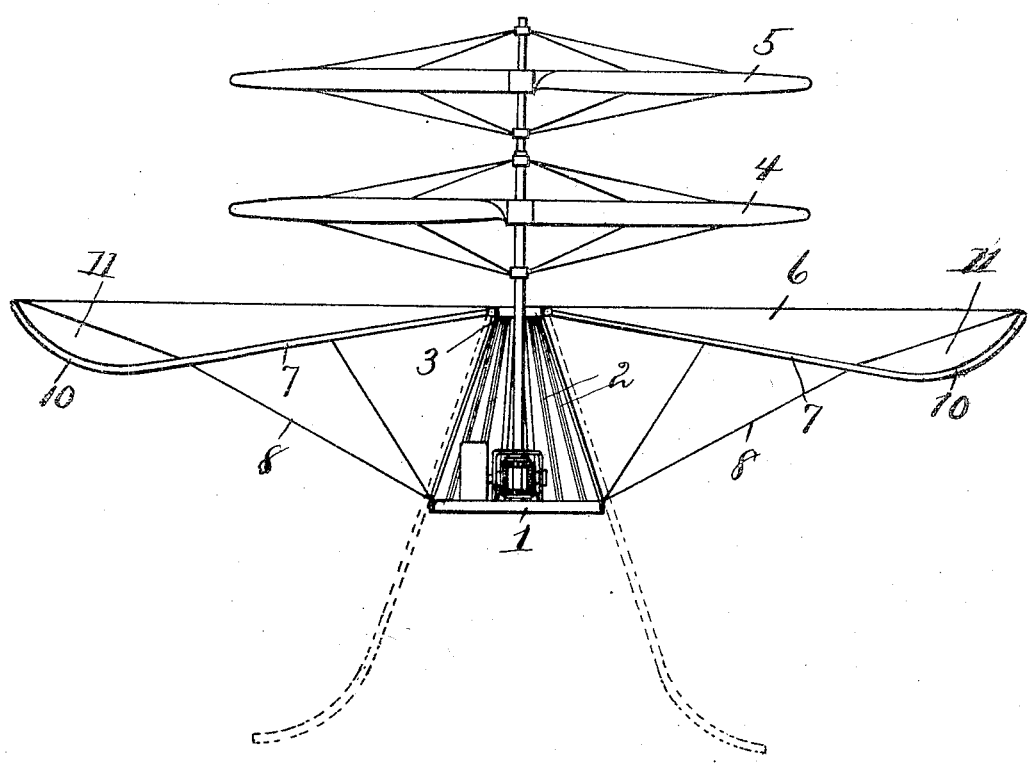

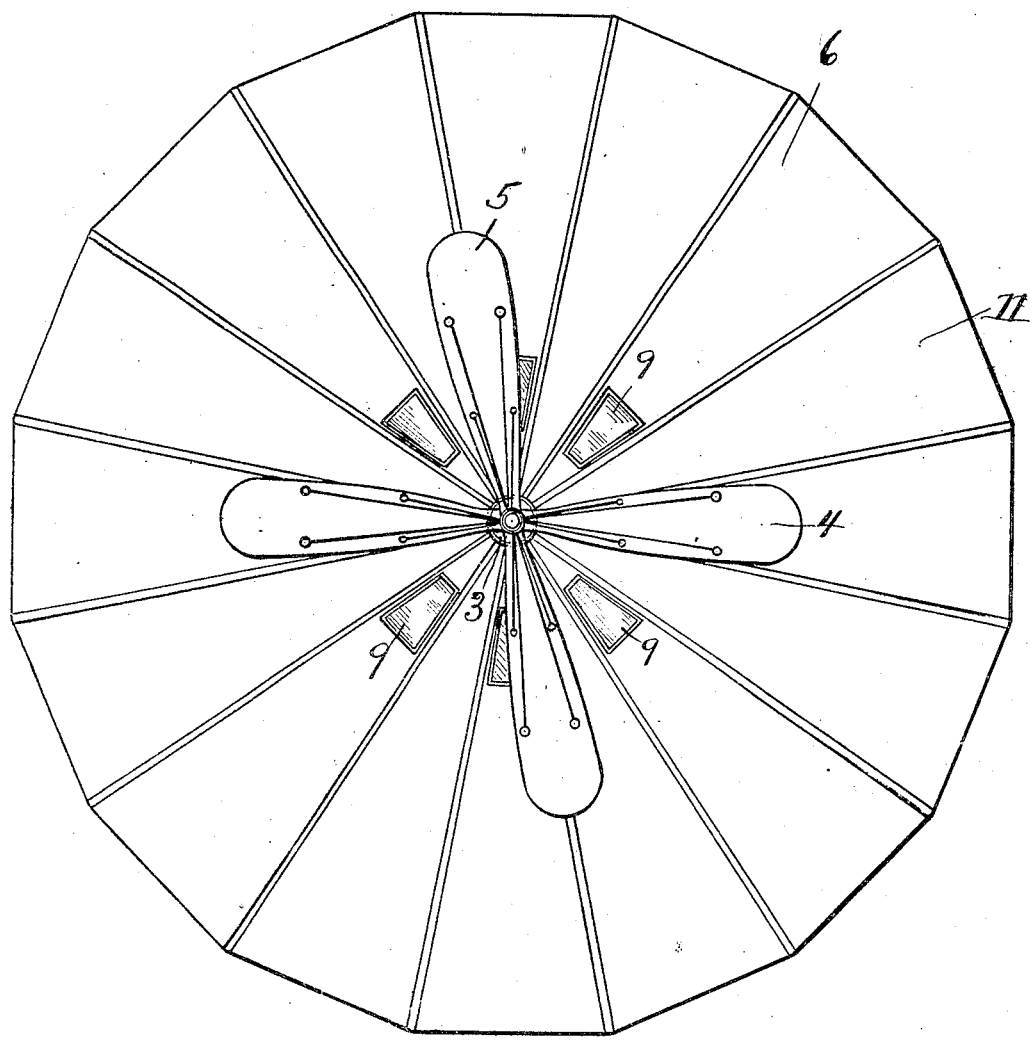

UNITED STATES PATENT OFFICE.

EMILE BERLINER, OF WASHINGTON, DISTRICT OF COLUMBIA.

PARACHUTE FOR HELICOPTERS.

1,110,180.  Specification of Letters Patent.  Patented Sept. 8, 1914.

Original application filed July 11, 1910. Serial No. 571,448. Divided and this application filed October 6, 1911. Serial No. 653,216.

*To all whom it may concern:*

Be it known that I, EMILE BERLINER, a citizen of the United States, residing at Washington, in the District of Columbia, have invented certain new and useful Improvements in Parachutes for Helicopters, of which the following is a description, reference being had to the accompanying drawing and to the letters and figures of reference marked thereon.

The invention relates to new and useful improvements in parachutes, or more especially to parachutes which are used in connection with helicopters, although it will be obvious from certain aspects of the invention, that the parachute may be used in connection with balloons or other flying apparatus.

An object of the invention is to provide a parachute which is shaped so that a maximum retarding force is obtained for a given area of surface, and without in any way disturbing or destroying the equilibrium of the parachute.

In the drawings which show by way of illustration one embodiment of the invention,—Figure 1 illustrates a helicopter having my improved parachute attached thereto, said view being a vertical sectional view through the parachute, and showing in dotted lines the parachute closed; and Fig. 2 is a top plan view of the same with the parachute extended.

As herein illustrated, the helicopter consists of a platform 1 from which rise supports 2, which are connected at their upper end to a ring 3. The platform, supports and ring constitute the framework of the helicopter.

A suitable supporting shaft is mounted in bearings in the frame, and is driven from a motor mounted on the platform. Said shaft extends above the ring 3, and carries a propeller 4. Said shaft is preferably hollow, and a second shaft extends through the hollow shaft and carries a propeller 5.

The construction of the propellers and the mechanism for operating the same is more fully shown and described in my copending application Serial No. 571,448, filed July 11th, 1910, of which this application is a division.

The helicopter is provided with a parachute 6, which consists of the usual ribs 7, which are hinged to the ring 3 at their upper ends, and flexible braces 8 serve to limit the opening of the parachute. The parachute, as herein shown, is attached at a point directly below the propellers, and when in closed position the entire frame of the helicopter is inclosed within the parachute.

The operator stands on the platform 1 and is covered by the parachute. In order to provide means for observation, I have provided certain of the panels of the parachute with windows 9. These windows may be of any desired number, and the panel of the parachute containing the window may, if desired, be made rigid, so as to hold the window in proper position relative to the operator.

The shape of my parachute is one of the essential features of the invention. Said parachute when open has the central portion thereof shaped like a very flat cone, or, for want of a better description, may be said to be shaped like a Japanese parasol. The outer edges of the parachute are curved upwardly, as at 10, forming a circumferential trough 11. Said circumferential trough in the descent of the parachute will cause a partial vacuum to be formed directly above the outer edge of the parachute, which will greatly increase the supporting lift and the stability of the same.

It is obvious that minor changes in the details of construction and arrangement of parts may be made, without in any way departing from the spirit of my invention as set forth in the appended claims, or sacrificing the principles thereof.

While I have shown the parachute as attached to a helicopter, it will be obvious that said parachute may be used independently of the helicopter, as in connection with balloons or other flying apparatus. I have also shown the parachute as attached to a point directly beneath the propeller blades. It will be obvious that the parachute may be attached to the frame of the helicopter at other points below the propeller blades.

Having thus described my invention, what I claim as new and desire to secure by Letters Patent, is:—

1. A parachute shaped like a Japanese parasol, with the edges thereof curved upwardly.

2. A parachute having the edges thereof curved upwardly thereby forming a circumferential trough, which causes a partial vacuum at the outer edges of the parachute during the descent thereof.

3. A parachute having a central cone-shaped portion, the lower edges of which are curved upwardly, forming a circumferential trough which causes a partial vacuum at the outer edge of the parachute during the descent thereof.

4. The combination with a helicopter, of a parachute therefor attached to the helicopter at a point above the operator, said parachute when closed having its lower edges extending to a point below the platform of the helicopter, and said parachute having windows formed therein.

In testimony whereof I affix my signature, in presence of two witnesses.

EMILE BERLINER.

Witnesses:
  M. McCLINTOCK,
  R. S. STUNZ.

Copies of this patent may be obtained for five cents each, by addressing the "Commissioner of Patents, Washington, D. C."